United States Patent [19]

Ota et al.

[11] Patent Number: 5,630,002
[45] Date of Patent: May 13, 1997

[54] OPTICAL FIBER CABLE

[75] Inventors: Junichi Ota; Kazuhiro Hamada; Yoshiyuki Suetugu; Hiroaki Sano; Hiroki Ishikawa, all of Kanagawa, Japan

[73] Assignee: Sumitomo Electric Industries, Ltd., Osaka, Japan

[21] Appl. No.: 607,350

[22] Filed: Feb. 26, 1996

[30] Foreign Application Priority Data

Feb. 27, 1995 [JP] Japan .................................... 7-038257

[51] Int. Cl.$^6$ .................................................. G02B 6/44
[52] U.S. Cl. ........................ 385/111; 385/104; 385/105; 385/110; 385/114
[58] Field of Search .................................. 385/100, 104, 385/105, 106, 109–114

[56] References Cited

U.S. PATENT DOCUMENTS

| 4,474,426 | 10/1984 | Yataki | 385/111 |
| 4,781,434 | 11/1988 | Kitagawa et al. | 385/105 |
| 4,807,962 | 2/1989 | Arroyo et al. | 385/105 |
| 4,820,014 | 4/1989 | Nishimura et al. | 385/105 |
| 4,997,257 | 3/1991 | Spedding | 385/114 |
| 5,117,809 | 6/1992 | Zeidler | 385/105 |
| 5,517,591 | 5/1996 | Wagman et al. | 385/114 |

FOREIGN PATENT DOCUMENTS

| 63-301911 | 12/1988 | Japan . | |
| 4-55803 | 2/1992 | Japan | 385/114 |

*Primary Examiner*—Rodney B. Bovernick
*Assistant Examiner*—Hemang Sanghavi
*Attorney, Agent, or Firm*—Cushman Darby & Cushman, IP Group of Pillsbury Madison & Sutro, LLP

[57] ABSTRACT

One or a plurality of reverse-lay grooves the direction of which is inverted periodically are cut in the outer circumference of a spacer, and an optical fiber tape unit or a stack of optical fiber tape units is accommodated in this groove. The length of the diagonal lines of the optical fiber tape unit or a stack of optical fiber tape units is larger than the width and depth of a bottom portion of the groove. In the inverted portion of the groove, the normal vector of the optical fiber tape unit or the stack of optical fiber tape units points to a direction perpendicular to an opening direction of the groove in the inverted portions of the groove.

13 Claims, 4 Drawing Sheets

5,630,002

OPTICAL FIBER CABLE

BACKGROUND OF THE INVENTION

1. Field of the Invention

The present invention relates to an optical fiber cable in which an optical fiber tape unit or a stack of a plurality of optical fiber tape units is accommodated in a spiral groove the direction of which is inverted periodically.

2. Description of the Related Art

An optical fiber cable having a spiral groove the direction of which is inverted periodically is known, for example, by Unexamined Japanese Patent Publication (kokai) No. Sho-63-301911.

FIGS. 5A and 5B are explanatory diagrams for explaining a conventional optical cable designed to have a spiral groove the direction of which is inverted periodically; FIG. 5A is an explanatory diagram taking a view from section, and FIG. 5B is an explanatory diagram taking a view from side. This explanatory diagram is based on the disclosure of the above-mentioned Publication, showing a so-called SZ-twisted optical fiber cable, that is, an optical fiber cable having a reverse-lay groove. In the drawing, the reference numerals 41 and 42 represent a center member and a groove, respectively. The groove 42 is cut spirally in the outer circumference surface of the center member 41, for example, a spacer, having an approximately circular section, and a not-shown coated optical fiber is accommodated in this groove 42. The spiral direction of the groove 42 is inverted periodically at a period P in the longitudinal direction of the center member 41. In FIG. 5B, there are two inverted positions, F1 and F2, and the difference between the rotation angles of the inverted positions F1 and F2 is an inversion angle $\phi$ in the circumferential rotation angle $\theta$ of the center member. Incidentally, FIG. 5D is a perspective view showing one example of the SZ-twisted optical fiber cable.

FIG. 6 is a sectional view of a conventional optical cable having spiral grooves the direction of which is inverted periodically. In the drawing, the reference numeral 51 represents a spacer; 52, a center tensile-resistance body; 53, grooves; 54, optical fiber units; 55, a pressing winding; and 56, a sheath. This drawing is based on the disclosure of the above-mentioned Publication. The four grooves 53 are cut into the spacer 51 which is a center member, and the optical fiber unit 54 is accommodated in each of the grooves 53. Further, the pressing winding 55 is given to the optical fiber units 54, and the outer circumference of the pressing winding 55 is coated with the sheath. In the above-mentioned Publication, only an embodiment in which three bare optical fibers are used in each optical fiber unit 54 is disclosed as a specific example. In this conventional cable, if an optical fiber tape unit or a stack of a plurality of optical fiber tape units is used as the optical fiber unit 54, bending distortion is produced in optical fibers in the optical fiber tape to thereby bring a problem in reliability of the optical fibers.

FIGS. 7A and 7B are explanatory diagrams for explaining the state where an optical fiber tape is accommodated in a conventional slot-type optical fiber cable; FIG. 7A shows the sectional shape in a grooved portion, and FIG. 7B shows the sectional shape of an optical fiber tape unit. In the drawing, the reference numeral 61 represents a spacer; 62, a groove; 63, a stack of a plurality of optical fiber units; 63a, an optical fiber tape unit; 64, a left wall; 65, a right wall; 66, a bottom portion; 67, an optical fiber; 68, a primary coating; and 69, a tape coating. This slot-type optical fiber cable is not an SZ-twisted optical fiber cable, but a S-twisted or Z-twisted optical fiber cable grooved in a straight line or having a not-inverted direction of twist.

In FIG. 7A, one or a plurality of grooves 62 are cut into the outer circumference of the spacer 61 having an approximately circular section. The stack of optical fiber tape units 63 is accommodated in this groove 62. Although a pressing winding or a sheath is often given thereto, they are omitted in the illustration. The section of this groove 62 is rectangular, and each of the left wall 64, the right wall 65 and the bottom portion 66 is straight. The side walls are perpendicular to the bottom portion, and the depth of the groove 62 is constant. The width between the left wall 64 and the right wall 65 may be slightly extended in the direction of the opening portion of the groove 62. In FIG. 7B, in the optical fiber tape unit 63a, the primary coating 68 is given to each of the optical fibers 67, and the four cores of the optical fibers are gathered and then coated with the tape coating 69. The stack of optical fiber tape units 63 shown in FIG. 7A is constituted by, for example, five layers of such optical fiber tape units 63a. The plane portion of the lowermost layer of them is put on the groove bottom portion 66, and the plane portions of the second layer et seq. are put one on one successively.

FIGS. 8A to 8C ar explanatory diagrams for explaining bending distortion of an optical fiber tape; FIG. 8A is an explanatory diagram for explaining the case where a desired linear body is bent, FIG. 8B is an explanatory diagram for explaining the case where the optical fiber tape is bent within a plane perpendicular to the tape plane, and FIG. 8C is an explanatory diagram for explaining the case where the optical fiber tape is bent within the tape plane. In the drawings, parts the same as those in FIGS. 7A and 7B are referenced correspondingly, and their description will be omitted. The reference numeral 71 represents a desired linear body, and 72 a center line of bending.

As shown in FIG. 8A, in the case where the desired linear body 71 is bent, let the radius of curvature in the neutral line of bending 72 R, distortion by bending $\epsilon$ and length from the neutral line of bending L at a special point P of the optical fiber core 71, and then $\epsilon$ is L/R. Accordingly, as shown in FIG. 8B, in the case where the optical fiber tape 63a is bent within a plane perpendicular to the tape plane where the optical fibers 67 (see FIG. 7C) are arrayed, the length from the center line of bending 72 is H/2 in the maximum, so that there is little distortion in the optical fibers 67. However, as shown in FIG. 8C, in the case where the optical fiber tape 63a is bent within the tape plane where the optical fibers 67 are arrayed, the length from the center line of bending 72 of one optical fiber becomes larger when the optical fiber comes near the end of the tape, so that the length takes a value near W/2 and a large distortion is produced in the optical fibers 67.

As shown in FIG. 7A, in the optical fiber cable where the plane portions of the optical fiber tape units 63a are put on the groove bottom portion 66 one on one successively, the optical fiber tape units 63a are bent by the spiral groove 62 in the case of an S-twisted or Z-twisted optical fiber cable having a not-inverted direction of twist. However, since the bending is as shown in FIG. 8B, little distortion is produced in the optical fibers 67.

However, in the case of an SZ-twisted optical fiber cable, a optical fiber tape unit is bent at the points F1 and F2 in the vicinity of the inverted portion of the spiral groove 42 shown in FIG. 5B, in the view from the outside of the groove as shown in FIG. 8C. That is, the optical fiber tape unit 63a is bent within the plane where the optical fibers 67 are arrayed so as to receive bending having a curvature center on the left of the left wall 64 or on the right of the right wall 65. As a result, there arises an excessive distortion in the leftmost and rightmost optical fibers 67 in the optical fiber tape unit 63a so as to lose its reliability. Therefore, in the SZ-twisted optical fiber cable, there arises a problem on the reliability of the optical fibers 67 in the case where the optical fiber tape unit 63a or the stack of optical fiber tape units 63 is accommodated in the groove.

SUMMARY OF THE INVENTION

It is an object of the present invention to provide an optical fiber cable having a spiral groove with a periodically inverted direction, in which there is no fear that an excessive distortion arises in optical fibers in an optical fiber tape even when an optical fiber tape unit or a stack of optical fiber tape units is accommodated in the groove.

An optical fiber cable according to the present invention is comprised of: a spacer which is a body of the optical fiber cable; a spiral groove being provided in an outer circumference of the spacer, the spiral groove having inverted portions that is inverted periodically; and an optical fiber tape unit being accommodated in the spiral groove. In the optical fiber cable, a normal vector of a tape plane of the optical fiber tape unit points to a direction perpendicular to an opening direction of the groove in the inverted portions of the groove while the normal vector of the tape plane of the optical fiber tape unit points to the opening direction of the groove in an intermediate portions between inverted portions of the groove. In addition, the spacer may have a plurality of spiral grooves. Further, a plurality of the optical fiber tape units may be stacked so that the stack of the optical fiber tape units are accommodated in the groove.

According to the present invention, the tape plane of an optical fiber tape points to the direction perpendicular to the opening direction of a groove in the inverted portion of the groove while the tape plane points to the opening direction of the groove in the intermediate portion between inverted portions of the groove. Accordingly, optical fibers are bent within a plane perpendicular to the tape plane in the inverted portions of the grooves and in the intermediate portion of the grooves, and little distortion arises in the optical fibers.

BRIEF DESCRIPTION OF THE DRAWINGS

In the accompanying drawings;

FIGS. 1A to 1D are an explanatory diagrams for explaining a first embodiment of an optical fiber cable of the present invention; in which FIG. 1A shows a section of a groove in an intermediate portion between inverted portions, FIG. 1D shows a section of the groove in an inverted portion, and FIGS. 1B and 1C show sections of the groove in the vicinity of the inverted portion;

FIGS. 2A to 2C are an explanatory diagrams for explaining a second embodiment of an optical fiber cable of the present invention; in which FIG. 2A shows a section of a groove in an intermediate portion between inverted portions, FIG. 2B shows a section of the groove in the vicinity of an inverted portion, and FIG. 2C shows a section of the groove in the inverted portion;

FIGS. 3A to 3C are explanatory diagrams for explaining a third embodiment of an optical fiber cable of the present invention; in which FIG. 3A shows a section of a groove in an intermediate portion between inverted portions, FIG. 3B shows a section of the groove in the vicinity of an inverted portion, and FIG. 3C shows a section of the groove in the inverted portion;

FIGS. 4A to 4C are explanatory diagrams for explaining a fourth embodiment of an optical fiber cable of the present invention; in which FIG. 4A shows a section of a groove in an intermediate portion between inverted portions, FIG. 4B shows a section of the groove in the vicinity of an inverted portion, and FIG. 4C shows a section of the groove in the inverted portion;

FIGS. 5A to 5D are explanatory diagrams for explaining an optical fiber cable designed to have a spiral groove the direction of which is inverted periodically; in which FIG. 5A is an explanatory diagram taking a view from section, FIG. 5B is an explanatory diagram taking a view from side, FIG. 5C is an explanatory diagram for explaining the angle of the vicinity of the inverted portions, and FIG. 5D is a perspective view showing one example of the optical fiber cable designed to have a spiral groove;

FIGS. 7A and 7B are explanatory diagrams for explaining the state where an optical fiber tape is accommodated in a conventional slot-type optical fiber cable; in which FIG. 7A shows the sectional shape in a grooved portion, and FIG. 7B shows the sectional shape of an optical fiber tape unit; and FIGS. 8A to 8C are explanatory diagrams for explaining bending distortion of an optical fiber tape; in which FIG. 8A is an explanatory diagram for explaining the case where a desired linear body is bent, FIG. 8B an explanatory diagram for explaining the case where the optical fiber tape is bent within a plane perpendicular to the tape plane, and FIG. 8C an explanatory diagram for explaining the case where the optical fiber tape is bent within the tape plane.

DETAILED DESCRIPTION OF THE INVENTION

Detailed description of the present invention will be described referring to the accompanying drawings.

Figure 1A:
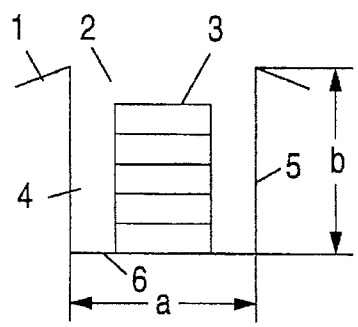
Figure 1B:
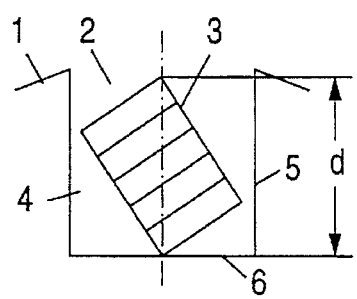
Figure 1C:
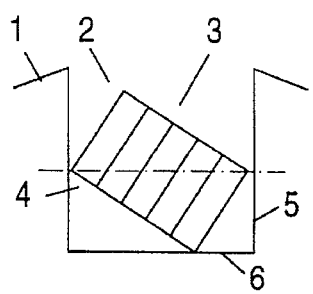
Figure 1D:
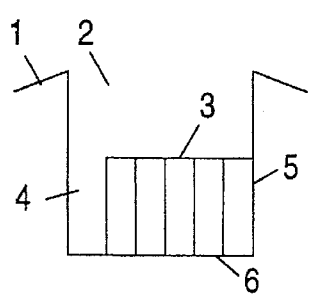

FIGS. 1A to 1D are explanatory diagrams for explaining a first embodiment of the optical fiber cable of the present invention; FIG. 1A shows a section of a groove in an intermediate portion between inverted portions, FIG. 1D shows a section of the groove in an inverted portion, and FIGS. 1B and 1C show sections of the groove in the vicinity of the inverted portion. In the drawings, the reference numeral 1 represents a spacer; 2, a groove; 3, a stack of optical fiber tape units; 4, a left wall; 5, a right wall; and 6, a bottom portion. FIGS. 1A to 1D show only the outline of the groove section. Although the sections of the groove are the same in shape in the respective drawings, the state where the stack of optical fiber tape units is accommodated is changed. The position where the stack of optical fiber tape units 3 is accommodated is slightly changed in accordance with excessive length and tension given at the time of accommodation.

Figure 5A:
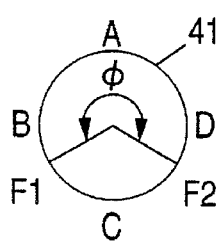

First, the structure of the optical fiber cable in this embodiment will be described with reference to FIG. 1A. The optical fiber cable in this embodiment is an SZ-twisted optical fiber cable, that is, an optical fiber cable having at least one reverse-lay groove as described with reference to FIGS. 5A and 5B. One or a plurality of reverse-lay grooves 2 the direction of which is inverted periodically are cut into the outer circumference of the spacer 1 the section of which is approximately circular, and the stack of optical fiber tape units 3 is accommodated in this groove 2. Although a pressing winding or a sheath is often given thereto, these are not shown. The section of this groove 2 is rectangular.

Figure 7A:
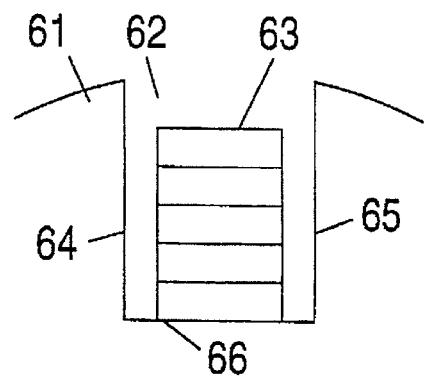
Figure 7B:
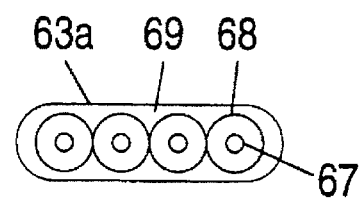

Assume that the width of the bottom 6 is a, and the height of the left wall 4 and the right wall 5, that is, the depth of the groove 2 is b. The width between the left wall 4 of the groove and the right wall 5 of the groove may be slightly extended in the direction of the opening portion of the groove 2. The stack of optical fiber tape units 3 and optical fiber tape units constituting it are the same as those shown in FIG. 7B, and the stack of optical fiber tape units 3 is constituted by, for example, five layers of the optical fiber tape units.

The shape of the section of the groove in this embodiment itself is similar to that of a conventional slot-type optical fiber cable which is different from an SZ-twisted one described with reference to FIG. 7. However, the width a of the bottom portion 6 and the depth b of the groove of the stack of optical fiber tape units 3 are established to be comparatively longer. Specially, when the length of the diagonal lines of the stack of optical fiber tape units 3 is d, the conditions d<a and d<b are established.

Figure 5B:
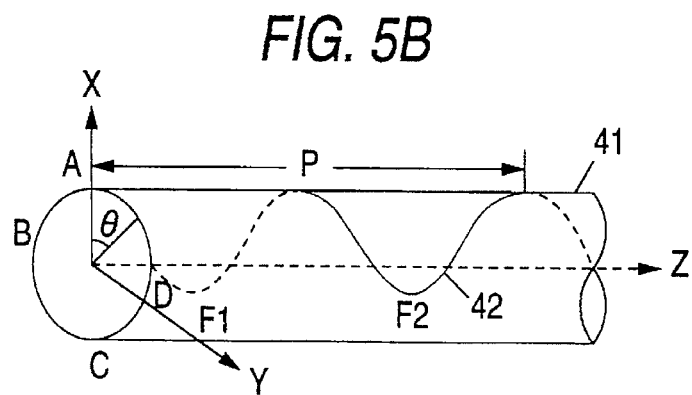
Figure 5C:
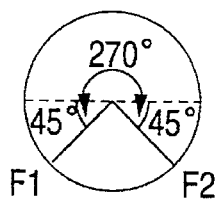
Figure 5D:
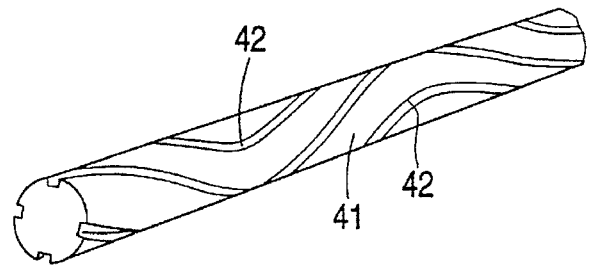
Figure 6:
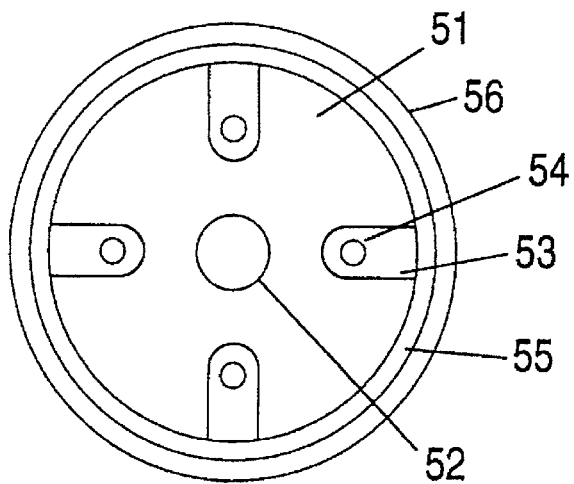
FIG. 6 is a sectional view of a conventional optical fiber cable having a spiral groove the direction of which is inverted periodically.

In the intermediate portion between SZ-twisted inverted portions, the stack of optical fiber tape units 3 is accommodated in the state shown in FIG. 1A. The optical fiber tape units are stacked one on one successively such that the plane portion of the lowermost unit is put on the groove bottom portion 6 and the plane portions of the following optical fiber tape units are put one on one successively. The normal vector of a tape plane of each optical fiber tape points to the opening direction of the groove. Therefore, in the intermediate portion between SZ-twisted inverted portions, there is no problem in the accommodating state as described above with reference to FIG. 7. The intermediate portion between inverted portions corresponds to a section centering a bent point of inversion between the inverted portions F1 and F2 in the groove 42 shown in FIG. 5B, and the inverted portions and the portions in the vicinity of them are eliminated therefrom. Specifically, as shown in FIG. 5B, there are at least two inverted portions, F1 and F2, and the difference between the rotation angles of the inverted positions F1 and F2 is an inversion angle $\phi$ in the circumferential rotation angle $\theta$ of the center member. Generally, as shown in FIG. 5C, the inversion angle $\phi$ is about 270°, and the vicinity of the inverted portions means the area of at least ±45° of the inverted position F1 or F2.

In an inverted portion of the groove 2, the stack of optical fiber tape units 3 is accommodated in the state as shown in FIG. 1D. The illustrated state shows the case where the center point of the radius of curvature of bending of inversion is on the left. That is, it is a view, of a groove section toward the Z-axis direction in an inverted portion corresponding to the inverted portion F2 in the SZ-twisted groove 42 shown in FIG. 5B. The plane portion of the first layer of the optical fiber tape units contacts with the right wall 5, and the respective plane portions of the following layers are put one on one successively toward left. Thus, the plane portions of the respective layers are arrayed transversely on the groove bottom portion 6, and the normal vector of a tape plane of each optical fiber tape points to the direction perpendicular to the opening direction of the groove.

Figure 8A:
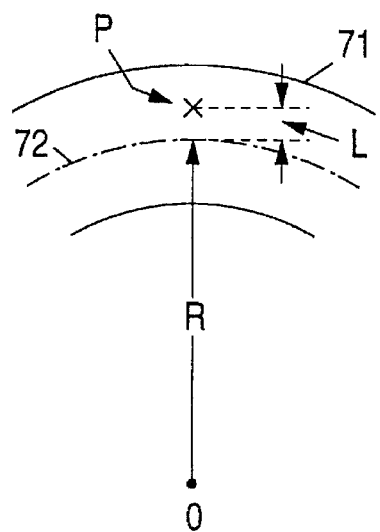
Figure 8B:
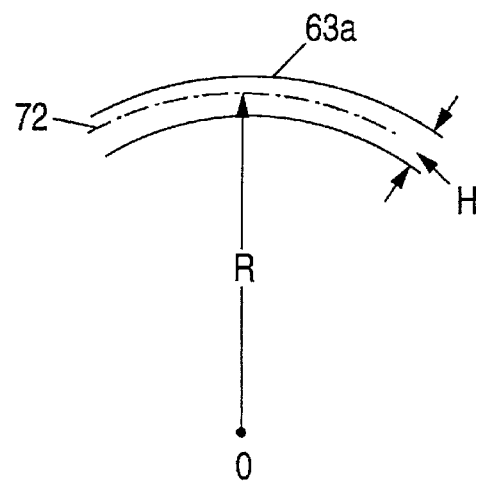
Figure 8C:
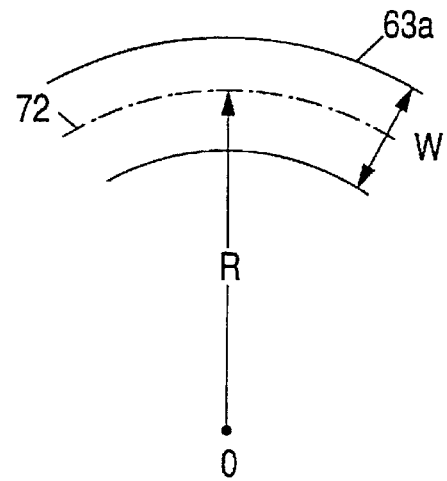

Therefore, each of the optical fiber tape units 63a constituting the stack of optical fiber tape units 3 is bent within a plane perpendicular to the tape plane as shown in FIG. 8B, so that little distortion arises in the optical fibers 67.

On the contrary, when the center point of the radius of curvature of bending of inversion is on the right, that is, when a groove section is viewed toward the Z-axis direction in the inverted portion corresponding to the inverted portion F1 in the SZ-twisted groove 42 shown in FIG. 5B, the plane portion of the first layer of the optical fiber tape units contacts with the left wall 4, and the respective plane portions of the following layers are put one on one successively toward right. Thus, the plane portions of the respective layers are arrayed transversely on the groove bottom portion 6, and the normal vector of a tape plane of each optical fiber tape points to the direction perpendicular to the opening direction of the groove. Therefore, little distortion arises in the optical fibers 6 in the same manner.

The stack of optical fiber tape units 3 is brought into a transient accommodating state as shown in FIGS. 1B and 1C in the vicinity of the inverted portions of the groove. In FIG. 1B, the diagonal lines of the stack of optical fiber tape units 3 become perpendicular to the groove bottom plane 6. Since not-shown pressing winding or sheath is given to the surrounding of the spacer 1, if the depth b of the groove 2 is not made larger than the length d of the diagonal lines, the stack of optical fiber tape units 3 cannot be brought into such a transient state and cannot be changed between the states of FIGS. 1A and 1D. In FIG. 1C, the diagonal lines of the stack of optical fiber tape units 3 become perpendicular to the left wall 4 and the right wall 5. Therefore, if the width a of the groove 2 is not made lager than the length d of the diagonal lines, the stack of optical fiber tape units 3 cannot be changed between the states of FIGS. 1A and 1D. Therefore, on the assumption that the sectional shape of the groove 2 is rectangular, the minimum groove is a square where the width a of the groove 2 and the depth b of the groove 2 are equal to the length d of the diagonal lines. Although the stack of optical fiber tape units 3 having five layers was illustrated and described above, the number of layers may be a desired one, and only one layer, that is, a single optical fiber tape unit may be operated in the same manner.

In a section of the groove shown in FIGS. 1A to 1D, each of the angle between the left wall 11 and the groove bottom portion 13 and the angle between the right wall 12 and the bottom portion 13 is linearly angled. However, by rounding the corners or adding a slop thereto, it is possible to change smoothly the state where the stack of optical fiber tape units 3 is accommodated.

A specific example of this first embodiment will be described. The outer diameter of the spacer was 8 mm. The sectional shape of the groove 2 was a square, and each of the width a and the depth b of the groove was both 2.3 mm. The pitch of groove inversion of the groove 2 was 500 mm, and this inversion was performed at every 275°. Five layers of optical fiber tape units each of which included four coated optical fibers and had a width of 1.1 mm and a thickness of 0.38 mm were piled up. Therefore, the base of the stack of optical fiber tape units was 1.1 mm, the height was 1.9 mm, and the Length of diagonal lines was 2.2 mm.

Figure 2A:
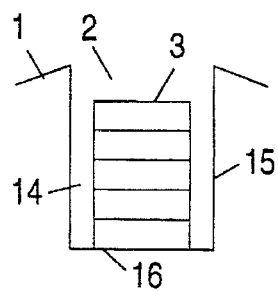
Figure 2B:
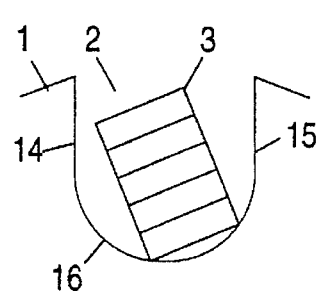
Figure 2C:
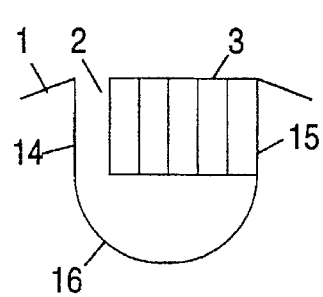

FIGS. 2A to 2C are explanatory diagrams for explaining a second embodiment of the optical fiber cable of the present invention; FIG. 2A shows a section of a groove in an intermediate portion between inverted portions, FIG. 2B shows a section of the groove in the vicinity of an inverted portion, and FIG. 2C shows a section of the groove in the inverted portion. In the drawings, parts similar to those in FIGS. 1A to 1D are referenced correspondingly, and their description will be omitted. The reference numeral 14 represents a left wall; 15, a right wall, and 16, a bottom portion. Each of the drawings shows only schematic view of a groove section. Although the shape of the groove section itself is not changed between FIGS. 2B and 2C, only the state where a stack of optical fiber tape units is accommodated is changed.

The optical fiber cable in this embodiment is also an SZ-twisted one similar to that in the first embodiment.

Although a pressing winding or a sheath is often given thereto, these are not shown. The shape of the section of this groove 2 is different in portions. The position where the stack of optical fiber tape units 3 is accommodated is slightly changed in accordance with excessive length and tension given at the time of accommodation.

As shown in FIG. 2A, the optical fiber cable has a rectangular groove section constituted by the left wall 14, the right wall 15 and the bottom portion 16 in an intermediate portion between inverted portions. Although the shape of this groove section is similar to that of the conventional slot-type optical fiber cable described with reference to FIG. 7A, it may be used the shape of groove section which satisfies special conditions as shown in FIG. 1A. The tape plane of each optical fiber tape in the stack of optical fiber tape units 3 points to the opening direction of the groove. Therefore, there is no problem in the accommodation state.

As shown in FIG. 2B, the optical fiber cable has a semi-circular or arc curved shape in the vicinity of inverted portions, in which the bottom portion 16 is deep in the center portion, and shallow in the left and right. In the stack of optical fiber tape units 3, the tape plane of each optical fiber tape begins to change its direction from the opening direction of the groove 2 to the direction perpendicular thereto.

As shown in FIG. 2C, the optical fiber cable has a semi-circular or arc curved shape also in inverted portions, in which the bottom portion 16 is deep in the center portion, and shallow in the left and right. In the stack of optical fiber tape units 3, the first layer contacts with the right wall 15, and the tape plane of each optical fiber tape points to the direction perpendicular to the opening direction of the groove. Therefore, not only little distortion arises in the optical fibers, but also the state where the stack of optical fiber tape units 3 is accommodated can be changed smoothly and easily in the front and rear of the inverted portions.

Similarly to the case of FIG. 1D, the illustrated state shows the case where the center point of the radius of curvature of bending of inversion is on the left. That is, it is a view, of a groove section toward the Z-axis direction in an inverted portion corresponding to the inverted portion F2 in the SZ-twisted groove 42 shown in FIG. 5B. On the contrary, when the center point of the radius of curvature of bending of inversion is on the right, that is, when a groove section is viewed toward the Z-axis direction in the inverted portion corresponding to the inverted portion F1 in the SZ-twisted groove 42 shown in FIG. 5B, the plane portion of the first layer of the stack of optical fiber tape units 3 contacts with the left wall 4, and the respective plane portions of the following layers are put one on one successively toward right. Thus, the plane portions of the respective layers are arrayed transversely on the groove bottom portion 6, and the normal vector of a tape plane of each optical fiber tape points to the direction perpendicular to the opening direction of the groove. Therefore, the state where the stack of optical fiber tape units 3 is accommodated can be changed smoothly and easily in the front and rear of the inverted portions.

Figure 3A:
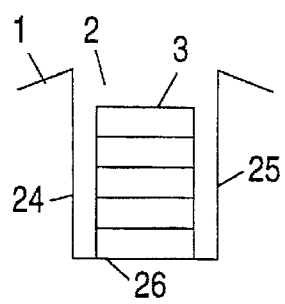
Figure 3B:
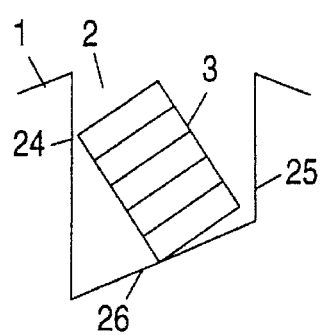
Figure 3C:
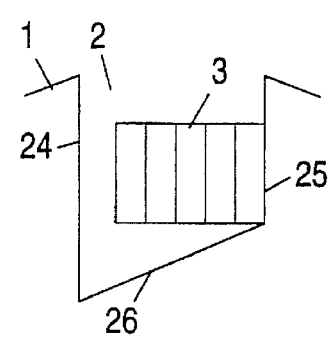

FIGS. 3A to 3C are explanatory diagrams for explaining a third embodiment of the optical fiber cable of the present invention; FIG. 3A shows a section of a groove in an intermediate portion between inverted portions, FIG. 3B shows a section of the groove in the vicinity of an inverted portion, and FIG. 3C shows a section of the groove in the inverted portion. In the drawings, parts similar to those in FIGS. 1A to 1D are referenced correspondingly, and their description will be omitted. The reference numeral 24 represents a left wall; 25, a right wall, and 26, a bottom portion. Each of the drawings shows only schematic view of a groove section. Although the shape of the groove section itself is not changed between FIGS. 3B and 3C, only the state where a stack of optical fiber tape units is accommodated is changed. The position where the stack of optical fiber tape units 3 is accommodated is slightly changed in accordance with excessive length and tension given at the time of accommodation.

The optical fiber cable in this embodiment is also an SZ-twisted one similar to that in the first and second embodiments. The pressing winding and sheath are not shown. Similarly to the second embodiment, the shape of the section of this groove 2 is different in portion.

As shown in FIG. 3A, the optical fiber cable has a rectangular groove section constituted by the left wall 24, the right wall 25 and the bottom portion 26 in an intermediate portion between inverted portions. Although the shape of this groove section is similar to that of the second embodiment shown in FIG. 2A, it may be used the shape of groove section which satisfies special conditions as shown in FIG. 1A.

As shown in FIG. 3B, in the optical fiber cable, the bottom portion 36 is linearly inclined in a straight line in the vicinity of the inverted portion. The illustrated state shows the case where the center point of the radius of curvature of bending of inversion is on the left. That is, it is a view, of a groove section toward the Z-axis direction in the vicinity of an inverted portion corresponding to the inverted portion F2 in the groove 42 shown in FIG. 5B. The bottom portion 26 of the groove 2 has a shallow straight inclination from the left wall 24 positioned inside the bending of the inverted portion, toward the right wall 25 positioned outside the bending of the inverted portion. In the stack of optical fiber tape units 3, the tape plane of each optical fiber tape begins to change its direction from the opening direction of the groove 2 to the direction perpendicular thereto.

As shown in FIG. 3C, the optical fiber cable has the same groove-sectional shape in the inverted portion as that of FIG. 3B. In the stack of optical fiber tape units 3, the first layer contacts with the right wall, and the tape plane of each optical fiber tape points to the direction perpendicular to the opening direction of the groove. Therefore, not only little distortion arises in the optical fibers 6, but also the state where the stack of optical fiber tape units 3 is accommodated can be changed smoothly and easily in the front and rear of the inverted portions.

On the contrary, when a groove section is viewed toward the Z-axis direction in the inverted portion corresponding to the inverted portion F1 in the SZ-twisted groove 42 shown in FIG. 5B, the bottom portion 26 of the groove 2 has a shallow straight inclination from the right wall 25 positioned inside the bending of the inverted portion, toward the left wall 24 positioned outside the bending of the inverted portion. The plane portion of the first layer of the optical fiber tape units contacts with the left wall 24, and the normal vector of the tape plane of each optical fiber tape points to the direction almost perpendicular to the opening direction of the groove.

Figure 4A:
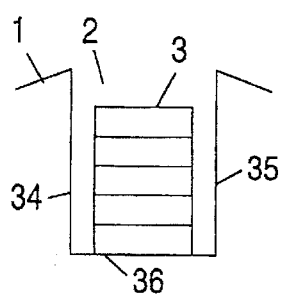
Figure 4B:
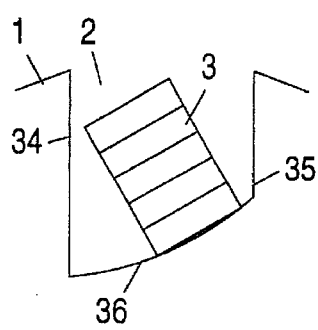
Figure 4C:
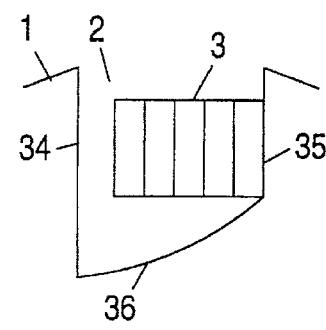

FIGS. 4A to 4C are explanatory diagrams for explaining a fourth embodiment of the optical fiber cable of the present invention; FIG. 4A shows a section of a groove in an intermediate portion between inverted portions, FIG. 4B shows a section of the groove in the vicinity of an inverted portion, and FIG. 4C shows a section of the groove in the inverted portion. In the drawings, parts similar to those in FIG. 1 are referenced correspondingly, and their description will be omitted. The reference numeral 34 represents a left wall; 35, a right wall, and 36, a bottom portion. Each of the drawings shows only schematic view of a groove section. The position where the stack of optical fiber tape units 3 is accommodated is slightly changed in accordance with excessive length and tension given at the time of accommodation.

In this embodiment, instead of the straight-line inclination in the third embodiment, the gradient of the inclination of the bottom portion 36 is changed gradually. That is, the bottom portion 36 has a curved inclination which becomes shallower gradually from the left wall 24 positioned inside the bending of the inverted portion, toward the right wall 25 positioned outside the bending of the inverted portion. The state where the stack of optical fiber tape units 3 is accommodated is changed in the same manner as in the third embodiment. Therefore, not only little distortion arises in the optical fibers 6, but also the state where the stack of optical fiber tape units 3 is accommodated can be changed smoothly and easily in the front and rear of the inverted portions.

In the above-mentioned second to fourth embodiments, the sectional shape of the groove is made the same in and in the vicinity of the inverted portions, and the state where the stack of optical fiber tape units is accommodated is changed transiently in the vicinity of the inverted portions. However, in the inverted portions, the sectional shape of the groove may be made rectangular in the same manner as that in the first embodiment of FIG. 1D. In this case, the width a of the bottom plane 6 and the depth b of the groove can be made smaller than those in the first embodiment. In addition, the section in the vicinity of the inverted portions, that is, the section where the accommodation state of the stack of optical fiber tape units 3 is changed transiently may be made longer. The point where the sectional shape of the groove is changed can be determined desirably.

In addition, the sectional shape of the groove may be changed gradually. As a special example in this case, after the arrangement over the entire length of the stack of optical fiber tape units 3 is determined so that the tape plane of the stack of optical fiber tape units 3 points to the direction perpendicular to the opening direction of the groove in the inverted portions of the groove 2, and points to substantially the opening direction of the groove in the bending points of the inverted portions, the sectional shape of the groove may be determined all over the groove 2 so as to surround the stack of optical fiber tape units 3 along this arrangement.

In the above-mentioned first to fourth embodiments, the description of the way of twisting when the stack of optical fiber tape units 3 is accommodated in the groove 2 was omitted. Although the way of twisting is not always defined, two examples thereof will be described.

A first example will be described with reference to FIG. 5. The stack of optical fiber tape units 3 is twisted by 90° to the left between the first inverted portion F1 and the second inverted portion F2 so that the optical fiber tape unit positioned in the uppermost layer of the stack of optical fiber tape units 3 is disposed inside the bending of the inverted portion F2 in the inverted portion F2. The stack of optical fiber tape units 3 is twisted by 90° to the right between the second inverted portion F2 and the next inverted portion so that the optical fiber tape unit is disposed in the uppermost layer of the stack of optical fiber tape units 3 again. The stack of optical fiber tape units 3 is twisted by 90° to the left in the next inverted portion so that the optical fiber tape unit is disposed inside the bending of the inverted portion, and the stack of optical fiber tape units 3 is twisted by 90° to the left and right alternately in the same manner, and accommodated in the groove 2.

In such a manner, the optical fiber tape unit positioned in the uppermost layer of the stack of optical fiber tape units 3 is extended by the reverse-lay groove 2 between the inverted portions, and is compressed by bending of inversion in the inverted portions. The optical fiber tape unit positioned in the lowermost layer of the stack of optical fiber tape units 3 is compressed by the reverse-lay groove 2 in the intermediate portion between the inverted portions, and is extended by the bending of the inversion in the inverted portions. Therefore, the individual optical fiber tape units are extended and compressed alternately repeatedly without torsion as a whole, so that the difference of extension and compression between the lower layer and the upper layer of the stack of optical fiber tape units 3 is reduced.

A second example will be described with reference to FIG. 5. The stack of optical fiber tape units 3 is twisted by 90° to the right in the intermediate portion between the first inverted portion F1 and the second inverted portion F2 so that the optical fiber tape unit positioned in the uppermost layer of the stack of optical fiber tape units 3 is disposed outside the bending of the inverted portion F2 in the inverted portion F2. The stack of optical fiber tape units 3 is further twisted by 90° to the right between the second inverted portion F2 and the next inverted portion so that this optical fiber tape unit is disposed in the lowermost layer of the stack of optical fiber tape units 3. The stack of optical fiber tape units 3 is twisted by 90° to the left in the next inverted portion so that this optical fiber tape unit is disposed inside the bending of the inverted portion, and the stack of optical fiber tape units 3 is further twisted by 90° to the left in the intermediate portion between the next inverted portion and the further next inverted portion so that the optical fiber tape unit is disposed in the uppermost layer of the stack of optical fiber tape units 3 again. The stack of optical fiber tape units 3 is twisted by 180° to the left and right alternately, and accommodated in the groove 2 in the same manner.

In such a manner, in the stack of optical fiber tape units 3, the uppermost layer and the lowermost layer are replaced with each other at every inverted portion, and receive extension and compression alternately by the reverse-lay grooves 2 in the intermediate portion between inverted portions. Therefore, the individual optical fiber tape units are extended and compressed alternately repeatedly without torsion as a whole, so that there is no difference of extension and compression between the lower layer and the upper layer of the stack of optical fiber tape units 3.

Also in the case where only one optical fiber tape unit is accommodated, there is an effect that the difference between the front side and the back side of the plane portion of the optical fiber tape unit is reduced or disappears.

In the above-mentioned second embodiment, the second example is used preferably as the way of twisting when the stack of optical fiber tape units 3 is accommodated in the groove 2. In the above-mentioned third and fourth embodiments, the first example is used preferably as the way of twisting when the stack of optical fiber tape units 3 is accommodated in the groove 2. That is, the sectional shape of the groove may be changed in a predetermined way of twisting so that the state where the stack of optical fiber tape units 3 is accommodated can be changed easily.

A sheath is given to the outside of the grooved spacer, including the case where a pressing winding is given. It is usual to use, for example, a coating layer by extrusion coating of synthetic resin as the sheath. Thereunder, for example, a pressing winding of non woven fabric or the like, a pressing winding in which a linear body such as nylon yarn or the like is wound spirally at a distance, or an aluminum layer may be provided. The sheath may be constituted by a plurality of layers by giving a synthetic resin coating on a pressing winding layer, and further giving a plurality of synthetic resin coating layers, and so on. In addition, the spacer may have no tensile-resistance body inside thereof.

Not to say, it is not necessary to provide any sheath directly on the optical cable according to the present invention. If a weather-resistant optical fiber tape is used, it can be laid as it is. A plurality of optical cables to which no sheath is given, or a plurality of ones to which a sheath such as pressing winding is given are twisted into a cable of multiple coated optical cables. In this case, tensile-resistance bodies may be disposed in desired places such as a center portion and so on.

As is apparent from the above description, according to the present invention, even in the case where an optical fiber tape unit or a stack of optical fiber tape units is accommodated in a reverse-lay groove the direction of which is inverted periodically, there is an effect that there is no fear of generation of an excessive distortion in optical fibers in the optical fiber tape so as to lose the reliability of the optical fibers.

What is claimed is:

1. An optical fiber cable comprising:

a spacer which is a body of said optical fiber cable;

a reverse-lay groove being provided in an outer circumference of said spacer, said reverse-lay groove having inverted portions and being inverted periodically; and an optical fiber tape unit being accommodated in said reverse-lay groove;

wherein a normal vector of a tape plane of said optical fiber tape unit points to a direction perpendicular to an opening direction of said groove in said inverted portions of said groove while the normal vector of the tape plane of said optical fiber tape unit points to the opening direction of said groove in intermediate portions between inverted portions of said groove.

2. An optical fiber cable according to claim 1, wherein said spacer has a plurality of said reverse-lay grooves.

3. An optical fiber cable according to claim 1, wherein a plurality of said optical fiber tape units are stacked so that the stack of said optical fiber tape units are accommodated in said groove.

4. An optical fiber cable according to claim 1, wherein a sectional width and depth of said groove are larger than a length of any sectional diagonal line of said optical fiber tape unit.

5. An optical fiber cable according to claim 3, wherein a sectional width and depth of said groove is larger than a length of any sectional diagonal line of the stack of said optical fiber tape units.

6. An optical fiber cable according to claim 1, wherein a section of said groove is substantially rectangular.

7. An optical fiber cable according to claim 1, wherein a sectional bottom portion of said groove is curved to be deeper at the center portion in a vicinity of the inverted portions of said groove, and has a predetermined depth in an intermediate portion between inverted portions of said grooves.

8. An optical fiber cable according to claim 1, wherein a sectional bottom portion of said groove is inclined from an inside toward an outside of bending of inversion in a vicinity of the inverted portions of said groove, and has a predetermined depth in the intermediate portions between inverted portions of said groove.

9. An optical fiber cable according to claim 1, wherein a sectional bottom portion of said groove is inclined in such a curved line that a depth of said groove is gradually reduced from an inside toward an outside of bending of inversion in a vicinity of the inverted portions of said groove, and said depth is made to be a predetermined value in the intermediate portions between inverted portions of said groove.

10. An optical fiber cable according to claim 1, wherein an inversion angle of reverse-lay groove is substantially 270°.

11. An optical fiber cable according to claim 7, wherein said vicinity of the inverted portions is an area of at least ±45° of the inverted position.

12. An optical fiber cable according to claim 8, wherein said vicinity of the inverted portions is an area of at least ±45° of the inverted position.

13. An optical fiber cable according to claim 9, wherein said vicinity of the inverted portions is an area of at least ±45° of the inverted position.

* * * * *